UNITED STATES PATENT OFFICE.

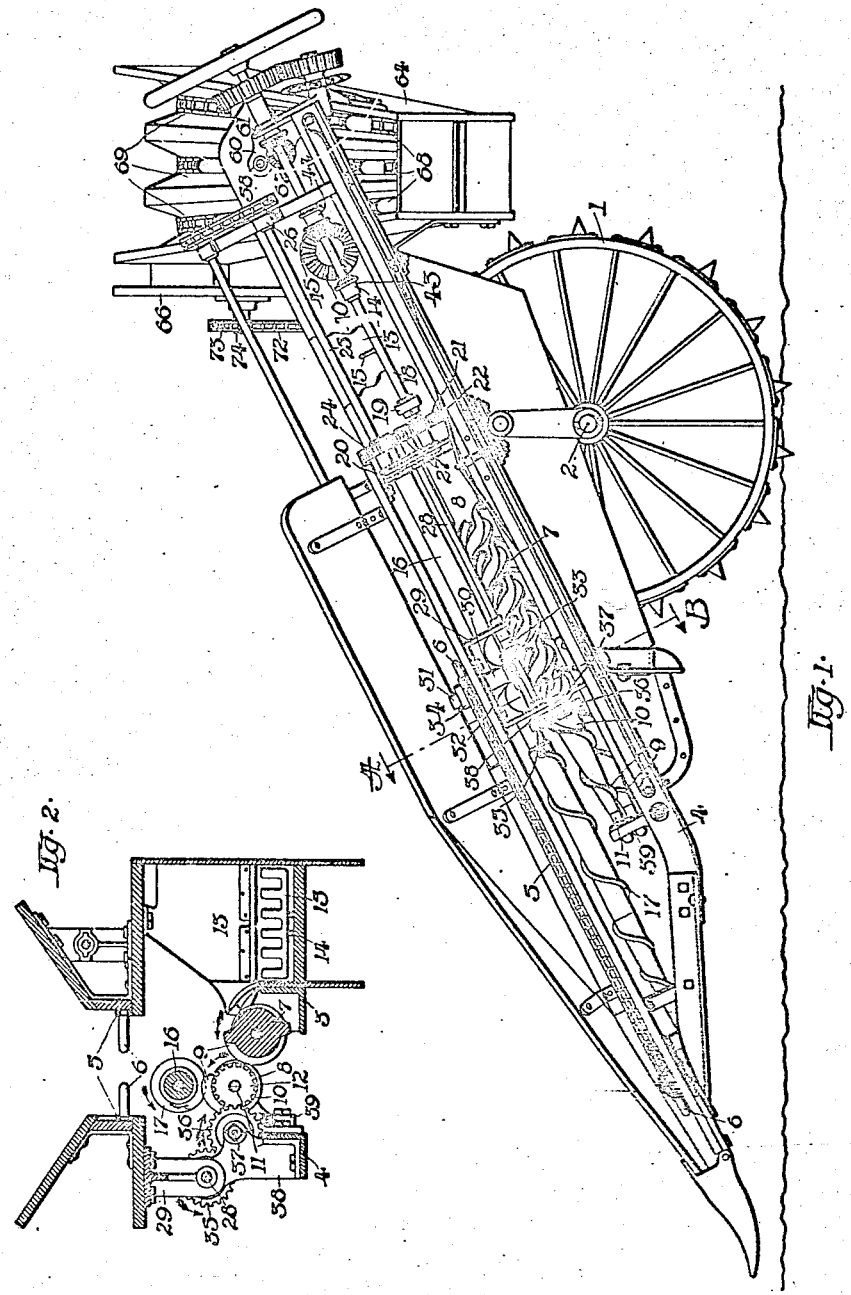

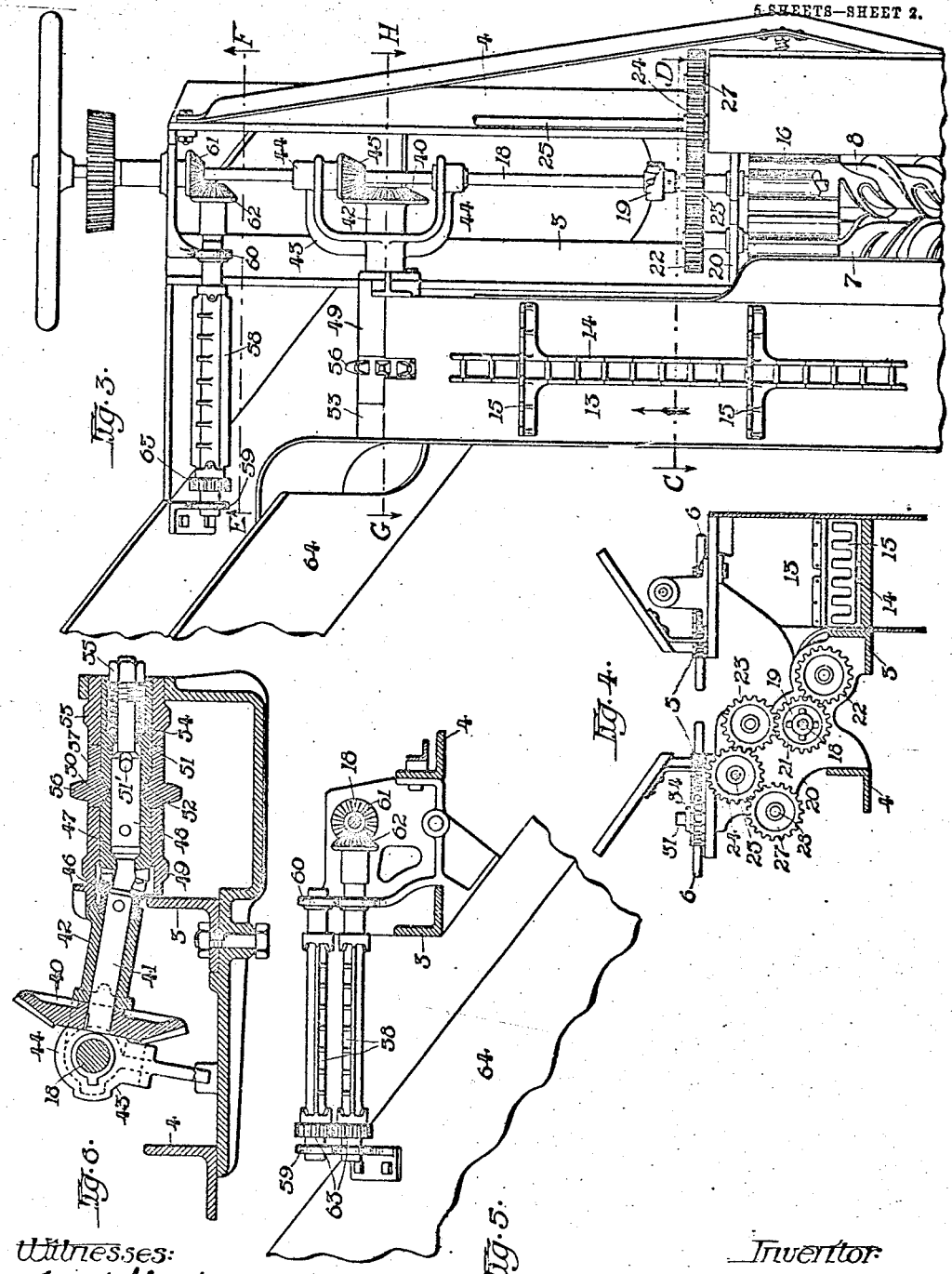

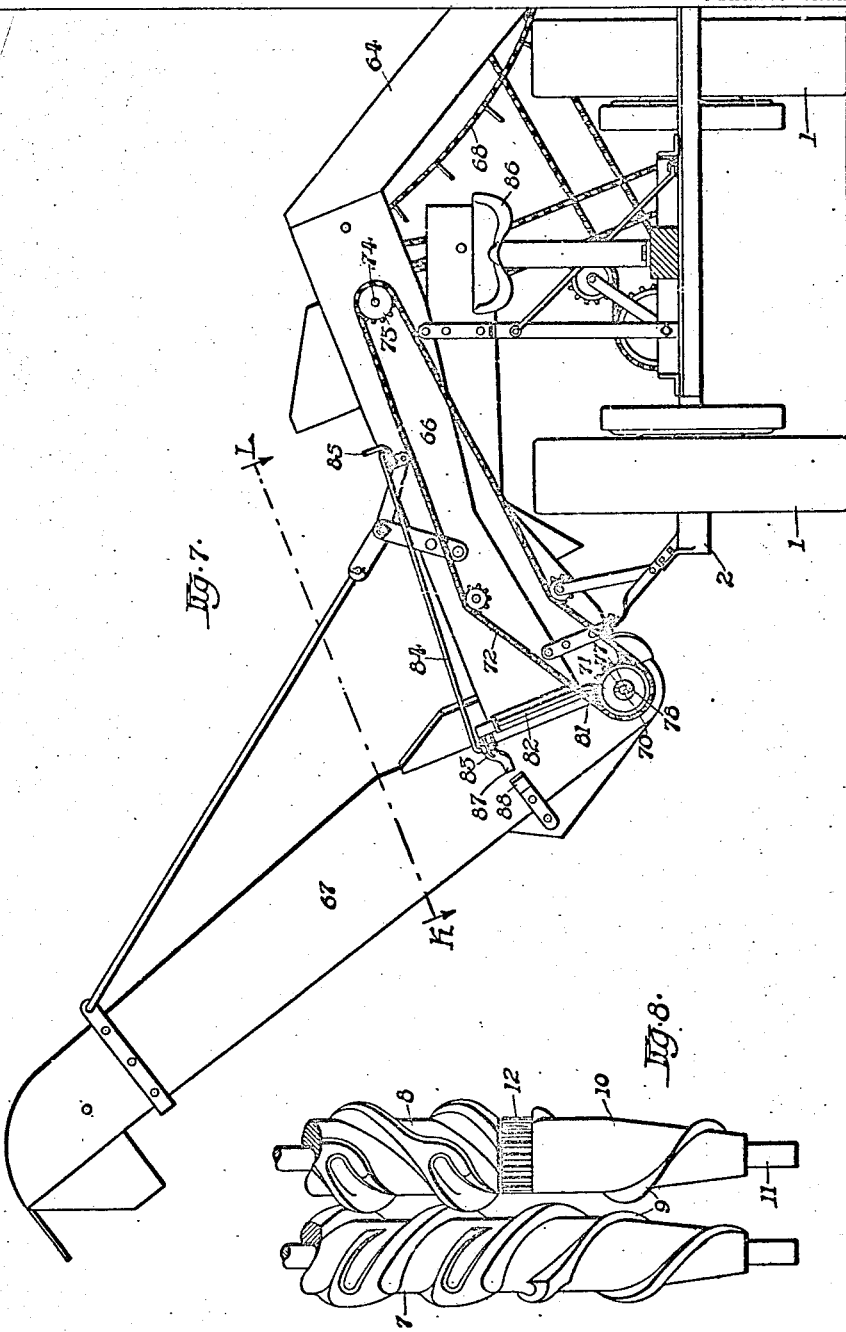

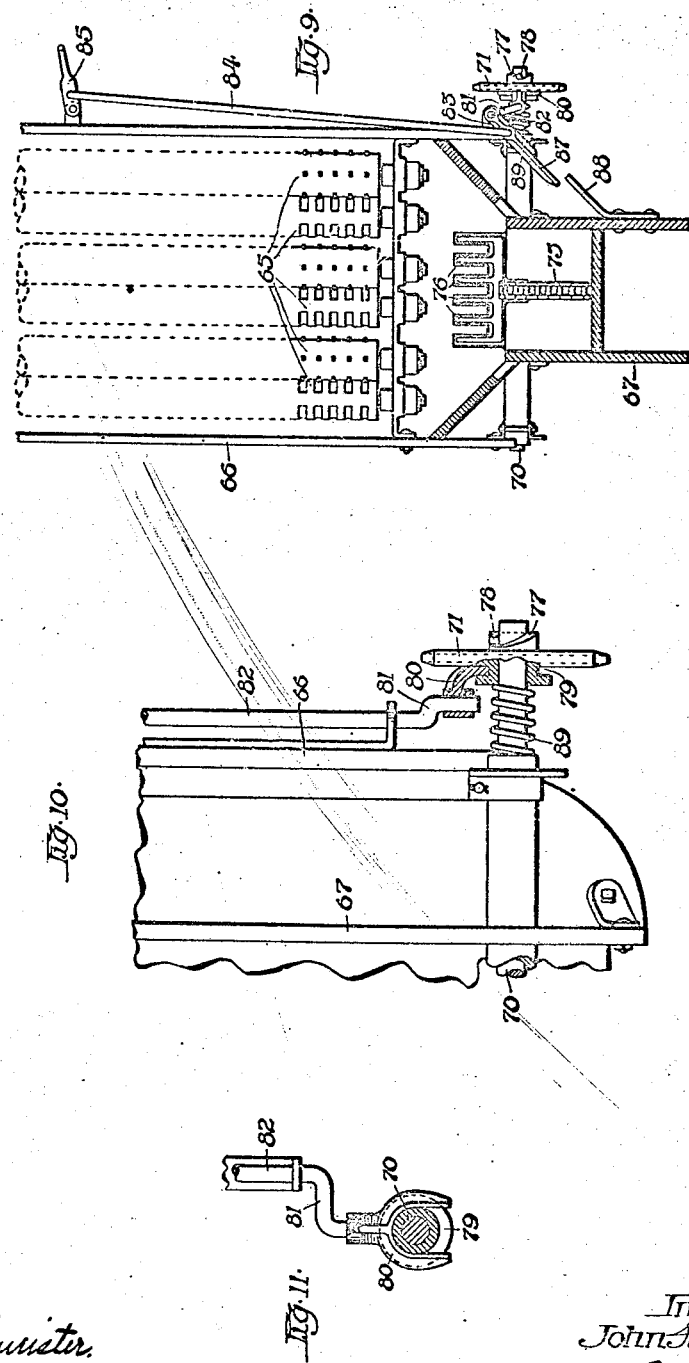

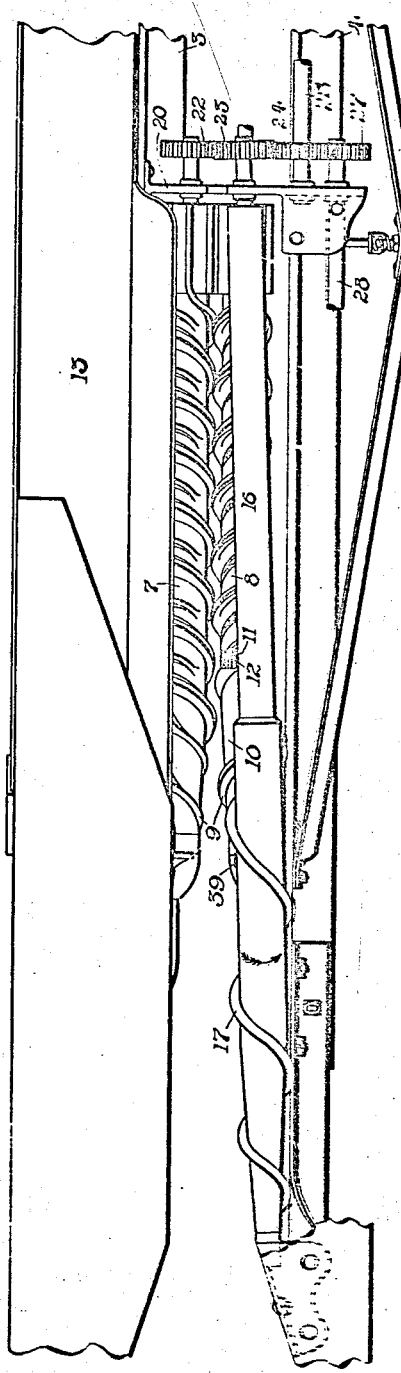

JOHN A. STONE, OF CHICAGO, ILLINOIS, ASSIGNOR TO INTERNATIONAL HARVESTER COMPANY, A CORPORATION OF NEW JERSEY.

CORN-HARVESTER.

No. 899,142.   Specification of Letters Patent.   Patented Sept. 22, 1908.

Application filed March 21, 1908. Serial No. 422,432.

*To all whom it may concern:*

Be it known that I, JOHN A. STONE, a citizen of the United States, residing at Chicago, in the county of Cook and State of Illinois, have invented certain new and useful Improvements in Corn-Harvesters, of which the following is a specification.

My invention relates to improvements in corn harvesters of the type wherein means are provided for severing the ears from the standing stalks and delivering them to a husking mechanism, from which they are conveyed to any suitable receptacle; the objects of my invention being to provide improved means for guiding and advancing the stalks toward the ear severing mechanism; to means for delivering the severed ears to the ear conveying and elevating mechanism; to means for transmitting motion to the ear conveying mechanism; to means for relieving the husking mechanism from danger of becoming clogged from any accumulation of loose stalks or leaves that may be carried up by the ear conveying mechanism; to means for automatically unclutching the husked corn elevator mechanism from its motion transmitting means when the elevator chute has been raised to a predetermined limit, and to other details of construction that will be described in the specification and illustrated in the accompanying drawing, in which—

Figure 1 is a side elevation of a part of a corn harvester in which my invention finds an embodiment; Fig. 2 is a cross section, along line A—B of Fig. 1, in the direction of the arrows; Fig. 3 is a top plan view of Fig. 1; Fig. 4 is a cross section along line C—D of Fig. 3, in the direction of the arrows; Fig. 5 is a cross section along line E—F of Fig. 3, and represents the details of construction in connection with the loose stalk and trash separating mechanism; Fig. 6 is a cross section along line G—H of Fig. 3, and represents in detail a part of the motion transmitting means in connection with the ear conveying mechanism; Fig. 7 is an end elevation of a part of the machine and designed to illustrate the connection between the husking mechanism and the husked corn elevator, and the means for automatically unclutching the driving mechanism of the latter from its source of power when it is raised to a predetermined height; Fig. 8 is a plan view of the forward ends of the stalk conveying and ear severing mechanism; Fig. 9 is a cross section along the line K—L of a part of Fig. 7, showing the delivery end of the husking mechanism, the receiving end of the husked corn elevator, and a plan view of the clutch shipping mechanism connected with the latter; Fig. 10 is a detached detail, partly in section, of the clutch shipping mechanism shown in Fig. 9; and Fig. 11 is a detail of the clutch shipping fork as connected therewith; and Fig. 12 is a top plan view of the ear severing rollers and stalk advancing mechanism.

The same reference characters designate like parts throughout the several views.

The carrying and traction wheels are represented by the numeral 1, and 2 is the axle upon which they are mounted.

A main frame, including angle bars 3 and 4, is supported upon said axle and arranged to receive the operative parts of the machine in a manner to substantially equalize the weight thereof upon opposite sides of the axle. The frame is inclined upward from front to rear, and at its forward end is adapted to straddle a row of corn as shown in Fig. 12. Gathering chains 5 are mounted upon opposite sides of the corn passageway and are provided with a common form of fingers 6 adapted to engage with the stalks and properly advance them toward the ear severing mechanism, which mechanism includes snapping rollers 7 and 8, mounted upon the right and left-hand sides of the passageway, respectively, and inclined upward and rearward. The rollers are provided with tapering forward ends, which have spirally arranged ribs 9 thereon that are adapted to convey the stalks rearward. The roller 7 and the ear severing portion of roller 8 are rotated in opposite directions and operate to feed the stalks downward between them and to sever the ears therefrom by contacting with their butt ends in a common way.

The tapered portion 10 at the forward end of roller 8 is rotated in a direction opposite to that of the body of the roller and in the same direction as roller 7, it being preferably journaled upon the extended end of a shaft 11 that forms a core for the body of roller 8, and is provided with a toothed portion 12 that engages with motion transmitting gears that will be described later.

The function of the tapered portion of the rollers with their spirally arranged ribs is to engage with fallen stalks and raise and advance them toward the ear severing portions, and if they are caused to rotate in opposite directions, the same as the body portions thereof and the ribs should come in contact with an ear of corn, their action is so aggressive that the ear will be drawn down and operated upon in such a manner as to shell more or less of the corn. When the tapered ends of the rollers are rotated in the same direction, as described, their stalk advancing function is unimpaired and all danger of shelling the corn from the ears is removed.

The roller 8 is mounted in a plane above that of roller 7, for the purpose of directing the severed ears toward an ear conveyer located upon the opposite side of the passageway and including a chute 13 and a conveyer chain 14, having ear engaging rakes 15 carried thereby; and 16 designates an ear deflecting roller mounted upon the same side of the passageway and in a plane above that of roller 8 and having its axis inclined toward the opposite side of the passageway as it extends upward and rearward.

The roller extends beyond the forward ends of the ear severing rollers, and that portion of the roller has a greater diameter than its rear portion and is provided with a spirally arranged rib 17 adapted to assist in raising fallen stalks and conveying them rearward.

Motion is transmitted to the several operative rollers from the source of power by means including a longitudinally arranged shaft 18 mounted upon the frame in rear of the rollers, and having at its forward end clutch mechanism 19, whereby it is operatively connected with the rear end of the journal of roller 8. The rear ends of the rollers are journaled in a cross-plate 20, secured to the frame members 3 and 4, and in rear of said cross-plate there is secured to the journal of roller 8 a pinion 21, that engages with a corresponding pinion 22 secured to the journal of roller 7, and also with a pinion 23, secured to the journal of the deflecting roller 16. Pinion 23 engages with and transmits motion to a pinion 24, secured to a supplemental longitudinally arranged shaft 25, having its forward end journaled in the cross-plate 20, and its rear end in a bracket 26, secured to the machine frame.

Pinion 24 engages with and transmits motion to a pinion 27 secured to a longitudinally arranged shaft 28, having its rear end journaled in the cross-plate 20, and extending forward is journaled in bearings supported by a bracket 29 secured to a fixed part of the machine; said bracket being provided with a journal bearing 30 arranged at right angles and located intermediate the bearings for the shaft, and in which is journaled a shaft 31, having secured to its lower end a bevel gear 32, engaging with a bevel pinion 33, secured to shaft 28; and secured to the opposite end of shaft 31 is a sprocket wheel 34 engaging with and transmitting motion to the gathering chain 5 upon the same side of the corn passageway. Secured to the forward end of shaft 28 is a pinion 35 that transmits motion to the tapered portion of roller 8 by means of its toothed portion 12, and an intermediate pinion 36, journaled upon a stud 37, secured to a supplemental bracket 38, secured to the frame member 4. The shaft 11, of the roller 8, upon which the tapered portion of the roller is journaled, extends forward and is journaled in a bracket 39, secured to frame member 4.

Motion is communicated to the ear conveying chain 14 by means of a bevel gear 40, secured to one end of a short transverse shaft 41, journaled in a sleeve 42, forming part of a bracket 43, secured to frame member 3, and having longitudinal bearings 44, in which is journaled shaft 18, and secured to shaft 18 is a bevel pinion 45 engaging with the gear 40. Secured to the opposite end of shaft 41 is a toothed clutch member 46 adapted to engage with a corresponding toothed clutch member 47, secured to a shaft 48.

The clutch member 47 is provided with a sleeve portion that is journaled in a bearing 49 secured to a fixed part of the machine, and is adapted to have a longitudinal movement therein, and its inner end has a conical head 50. Secured to the opposite end of shaft 48, in a manner to rotate therewith and have a limited longitudinal movement thereon, is a sleeve 51, by means of the pin 51¹ passing through a slot in the sleeve, the latter having at its inner end a conical head 52 corresponding with the head 50, and the sleeve is journaled in a bearing 53 supported by a fixed part of the machine, and is also provided with a counterbore portion adapted to receive a coiled spring 54, that surrounds a reduced portion of the shaft and operates between an adjusting nut 55 and the sleeve in a manner to yieldingly press the conical heads toward each other.

A sprocket wheel 56 is journaled upon the the inner ends of the sleeves, is engaged with the chain 14, and is provided with an interior annular ring 57 adapted to frictionally engage with the opposing conical heads of the sleeves in a manner to be driven thereby, and the amount of pressure upon the friction members is regulated by means of the adjusting nut 55.

By means of the above described frictional drive for the ear conveyer, all danger of damage to its operative parts, due to accidental clogging, is avoided.

In the operation of the machine under certain conditions of crop, a large amount of loose leaves and broken stalks is delivered to the ear conveyer along with the ears, and if allowed to pass to the husking mechanism will seriously impair its effective operation; and to guard against such contingency I have arranged at the delivery end of the chute 13 a pair of transversely operating relief rollers 58, that are journaled in brackets 59 and 60 secured to fixed parts of the machine frame; the lower roller being operatively connected with the longitudinal shaft 18 by means of a bevel pinion 61, secured to said shaft, and a similar pinion 62 secured to the projecting end of the shaft of the lower roller; the upper roller being driven in an opposite direction by means of the pinions 63 at the opposite ends of the rollers and adapted to engage with each other. In operation the rollers engage with any loose leaves or stalks that are carried up by the chain 14, and separate them from the ears that are delivered over the end of chute 13, and into a transversely arranged chute 64, at the rear of the machine, that is inclined upward to the receiving end of a series of husking rollers 65, mounted in a frame 66, that is inclined downward toward the receiving end of a husked corn conveyer and delivery chute 67.

The unhusked ears are conveyed to the husking mechanism by means of carrier chains 68, operating at the bottom of V-shaped channels 69, that are formed in the bottom of chute 64; the channels upon opposite sides of the central one diverging outward and upward for the purpose of delivering the ears to separate pairs of husking rollers.

A transverse shaft 70 is journaled at the lower end of the husking mechanism frame 66, and the corn delivery chute 67 is pivotally mounted thereon in a manner permitting its outer and delivery end to be raised or lowered as may be required. Motion is communicated to the shaft 70 by means of a sprocket wheel 71, and a chain 72 engaging with a sprocket wheel 73, secured to a transverse shaft 74 at the upper end of the frame 66 carrying the husking mechanism.

The shaft 70 communicates motion to an ear conveying chain 75, having rake members 76 secured thereto; the mechanism being adapted to convey the husked ears upward to the delivery end of the conveyer.

It is desirable, in the operation of machines of this character, to provide means whereby the ear elevating and delivering mechanism may be temporarily thrown out of action, as in turning at the corners of a field, or when the corn receiving wagon is not in position to receive the corn. To effect this result I provide mechanism as follows: The sprocket wheel 71 is adapted to have longitudinal movement upon the shaft 70, and is provided at the outer end of its hub with clutch teeth 77, that are adapted to engage with a pin 78 extending transversely through said shaft; and the inner end of the hub is provided with a peripheral groove 79 that is adapted to receive a clutch shipping fork 80 in a common way, and which is operatively connected with a crank 81 at the lower end of a vertically arranged shaft 82, that is pivotally attached to the frame 66; the upper end of the shaft being provided with a crank arm 83 secured thereto, and to which is pivotally connected one end of a link 84, the opposite end of said link being pivotally connected with a hand lever 85, that is pivotally mounted upon the frame 66 within convenient reach of an operator in the seat 86. When the ear elevator chute is folded for transportation purposes, the ear conveying mechanism is thrown out of action, which may be effected by the means as described; but should the chute be accidentally raised beyond a predetermined limit in the operation of the machine and the operating mechanism be thereby subjected to undue strain, liable to cause breakage to occur, I have provided means that will operate automatically to disengage the clutch mechanism when such limit of the chute's movement has been reached; the means consisting in providing an extension 87 to the crank arm 83, and a bracket 88, secured to the side of the chute 67, is adapted to contact therewith in a manner to rock the shaft 82 in its bearings and disengage the clutch mechanism temporarily against the action of a coiled spring 89 surrounding the shaft 70 and operative between the hub of the sprocket wheel and the end of the bearing for the shaft to normally hold the clutch members in engagement.

What I claim as my invention, and desire to secure by Letters Patent, is:

1. A corn harvester having, in combination, stalk advancing and ear severing mechanism, including a stalk passageway, rollers mounted upon opposite sides of said passageway, and means for rotating said rollers in opposite directions, said rollers having tapered portions at their forward ends, and means for rotating one of said tapered portions in a direction opposite to that of the body portion of the roller.

2. A corn harvester having, in combination, a pair of stalk advancing and ear severing rollers arranged to operate upon opposite sides of a row of corn, and means for rotating said rollers in opposite directions, one of said rollers having two parts and means for rotating one of said parts in a direction opposite to the direction of rotation of the other part.

3. A corn harvester having, in combination, a pair of stalk advancing and ear severing rollers arranged to operate upon opposite sides of a row of corn, and means for rotating said rollers in opposite directions, one of said rollers having two parts, one of said parts journaled upon a shaft forming a core for the other part, and means for rotating one of said parts in a direction opposite to the direction of rotation of the other part.

4. A corn harvester having, in combination, stalk advancing and ear severing mechanism, including a stalk passageway, rollers mounted upon opposite sides of said passageway, and means for rotating said rollers in opposite directions, said means including a longitudinally arranged shaft in rear of said rollers and operatively connected therewith by means of intermeshing pinions, said rollers having tapered portions at their forward ends, and means for rotating one of said tapered portions in a direction opposite to that of the body portion of the roller, said means including a shaft arranged at one side of said roller and substantially parallel therewith, said shaft being driven by means of gear connections at its rear end with the roller driving mechanism, and having gear connections at its forward end with said tapered portion of said roller.

5. In a corn harvesting machine, in combination, stalk advancing and ear severing rollers inclined upward and rearward and arranged in a manner to receive the standing stalks between their forward ends and advance them rearward and downward, one of said rollers being journaled in a higher plane than the other, an ear conveyer at one side of the lower roller, means for deflecting the severed ears toward said conveyer, said means including a roller journaled in a plane above the higher roller and upon the same side of the machine, and having its forward end extended beyond the receiving end of the ear severing rollers and having a spirally arranged rib on said extended end, the axis of said roller being inclined upward and toward said ear conveyer.

6. In a corn harvesting machine, in combination, a stalk passageway, stalk advancing and ear severing rollers journaled upon opposite sides of said passageway, an ear conveyer arranged at one side of said passageway, said conveyer including a sprocket chain, means for communicating motion to said chain, said means including a sprocket wheel engaging therewith, a driving shaft, opposing friction clutch members mounted upon said shaft and having one of said members movable longitudinally thereon, said sprocket wheel being arranged between said friction clutch members and adapted to be rotated thereby.

7. In a corn harvesting machine, in combination, a stalk passageway, stalk advancing and ear severing rollers journaled upon opposite sides of said passageway, an ear conveyer arranged at one side of said passageway, said conveyer including a sprocket chain, means for communicating motion to said chain, said means including a sprocket wheel engaging therewith, a driving shaft, opposing friction clutch members mounted upon said shaft and having one of said members movable longitudinally thereon, a spring operative in a manner to yieldingly press said clutch members toward each other, said sprocket wheel being arranged between said clutch members and adapted to be rotated thereby.

8. In a corn harvesting machine, in combination, a stalk passageway, stalk advancing and ear severing rollers journaled upon opposite sides of said passageway, an ear conveyer arranged at one side of said passageway, said conveyer including a sprocket chain, means for communicating motion to said chain, said means including a sprocket wheel engaging therewith, a driving shaft, a clutch sleeve secured to one end of said shaft and having an inner conical head, a clutch sleeve secured to the opposite end of said shaft in a manner to be rotated thereby and to have a longitudinal movement thereon, said sleeve having a conical head at its inner end, said sprocket wheel mounted upon said sleeves and having an interior annular ring adapted to engage frictionally with the opposing conical heads of said sleeves.

9. In a corn harvesting machine, in combination, a stalk passageway, stalk advancing and ear severing rollers journaled upon opposite sides of said passageway, an ear conveyer arranged at one side of said passageway, said conveyer including a chute inclined rearward and upward, two transversely arranged rollers beyond the rear end of said chute adapted to receive broken stalks and leaves carried up by the ear conveyer, and means for rotating said rollers in opposite directions.

JOHN A. STONE.

Witnesses:
 STEPHEN I. SCHULTZ,
 OSCAR A. ANDERSON.